(12) United States Patent
Fidh et al.

(10) Patent No.: US 10,780,765 B2
(45) Date of Patent: Sep. 22, 2020

(54) LOW-FRICTION RIDE PLATE FOR OPERATING AN AIRFLOW DAMPER OF A VEHICLE HVAC REGISTER AND METHOD OF FORMATION THEREOF

(71) Applicant: Ford Global Technologies, LLC, Dearborn, MI (US)

(72) Inventors: Steven Nicholas Fidh, Ann Arbor, MI (US); Das Surajit, Chennai (IN); Kumar Amrendra, Chennai (IN); Vikas Saigal, Chennai (IN)

(73) Assignee: Ford Global Technologies, LLC, Dearborn, MI (US)

( * ) Notice: Subject to any disclaimer, the term of this patent is extended or adjusted under 35 U.S.C. 154(b) by 701 days.

(21) Appl. No.: 15/617,655

(22) Filed: Jun. 8, 2017

(65) Prior Publication Data

US 2018/0354345 A1 Dec. 13, 2018

(51) Int. Cl.
*B60H 1/34* (2006.01)
(52) U.S. Cl.
CPC ... *B60H 1/3421* (2013.01); *B60H 2001/3478* (2013.01)
(58) Field of Classification Search
CPC ............... B60H 1/3421; B60H 1/3414; B60H 2001/3471; B60H 2001/3478
USPC ........................................................ 454/155
See application file for complete search history.

(56) References Cited

U.S. PATENT DOCUMENTS

| | | | |
|---|---|---|---|
| 3,354,808 A | 11/1967 | Macrow | |
| 4,669,370 A * | 6/1987 | Hildebrand | B60H 1/3435 454/155 |
| 4,687,250 A * | 8/1987 | Esche | B60N 2/06 297/300.5 |
| 4,979,709 A * | 12/1990 | Ishikawa | F16M 11/041 248/187.1 |
| 5,971,847 A | 10/1999 | Webb | |

(Continued)

FOREIGN PATENT DOCUMENTS

| | | | |
|---|---|---|---|
| EP | 1538009 | 1/2007 | |
| FR | 2844749 A1 * | 3/2004 | ........... B60H 1/3421 |

(Continued)

OTHER PUBLICATIONS

KR20-0462226 Y1 English machine translation, Aug. 27, 2012 (Year: 2012).*

*Primary Examiner* — Edelmira Bosques
*Assistant Examiner* — Phillip Decker
(74) *Attorney, Agent, or Firm* — David Coppiellie; Price Heneveld LLP

(57) ABSTRACT

A vehicle air register includes an airflow damper disposed within a register housing. A rotationally-operable control is coupled to the airflow damper and the register housing. A ride plate is disposed within the register housing and that slidably receives the control to define open and closed positions of the airflow damper. The control includes a biased pin that engages the ride plate. The ride plate is made of a different material than the housing. A method for forming a vehicle register includes forming a ride plate that is made of a first material, forming a register housing made of a second material, and having a plate receptacle defined therein, disposing the ride plate within the plate receptacle, and disposing a damper and damper control within the housing.

17 Claims, 11 Drawing Sheets

(56) References Cited

U.S. PATENT DOCUMENTS

| | | | |
|---|---|---|---|
| 6,196,504 B1 * | 3/2001 | Lemke | F16M 11/041 248/187.1 |
| 6,431,257 B1 * | 8/2002 | Sano | B60H 1/00064 165/202 |
| 6,494,780 B1 * | 12/2002 | Norbury, Jr. | F24F 13/06 454/155 |
| 6,582,293 B1 * | 6/2003 | Siniarski | B60H 1/3414 454/155 |
| 6,881,139 B2 | 4/2005 | Yang | |
| 7,404,760 B2 | 7/2008 | Bowler et al. | |
| 7,575,510 B2 * | 8/2009 | Kim | B60H 1/3428 454/155 |
| 7,604,533 B2 | 10/2009 | Ogura et al. | |
| 7,997,403 B2 * | 8/2011 | Larsson | B65G 25/04 198/763 |
| 7,997,964 B2 | 8/2011 | Gehring et al. | |
| 8,740,677 B2 * | 6/2014 | Steinbeiss | B60H 1/3442 454/154 |
| 8,991,861 B1 * | 3/2015 | Iwakawa | B62D 1/189 280/775 |
| 9,110,492 B2 * | 8/2015 | Puskar, Jr. | G05G 1/10 |
| 9,821,631 B2 * | 11/2017 | Kim | B60H 1/3421 |
| 2013/0057042 A1 * | 3/2013 | Kortwig | B60N 2/20 297/378.1 |
| 2015/0135895 A1 * | 5/2015 | Tay | F16H 63/065 74/817 |
| 2015/0374272 A1 * | 12/2015 | Schwartz | A61B 5/15019 606/172 |

FOREIGN PATENT DOCUMENTS

| | | | |
|---|---|---|---|
| KR | 20090120262 A | * | 11/2009 |
| KR | 200462226 Y1 | * | 9/2012 |

\* cited by examiner

LOW-FRICTION RIDE PLATE FOR OPERATING AN AIRFLOW DAMPER OF A VEHICLE HVAC REGISTER AND METHOD OF FORMATION THEREOF

FIELD OF THE INVENTION

The present invention generally relates to heating, ventilation and air conditioning (HVAC) systems for vehicles, and more specifically, a low-friction ride plate incorporated within a control for an air register damper within a vehicle HVAC system.

BACKGROUND OF THE INVENTION

Conventional automobiles include HVAC systems having various registers placed within various portions of a passenger cabin for the vehicle. These registers typically include operable vanes that can be used to direct the flow of air. Certain air registers can include interior dampers that can open and close an air conduit leading to the register for completely shutting off airflow to the register.

SUMMARY OF THE INVENTION

According to one aspect of the present invention, a vehicle air register includes an airflow damper disposed within a register housing. A rotationally-operable control is coupled to the airflow damper and the register housing. A ride plate is disposed within the register housing and slidably receives the control to define open and closed positions of the airflow damper. The control includes a biased pin that engages the ride plate. The ride plate is made of a different material than the housing.

Embodiments of the first aspect of the invention can include any one or a combination of the following features:
- the ride plate is disposed within a plate receptacle that positions the ride plate proximate the control
- the ride plate includes a plurality of rotational positions of the airflow damper, the plurality of rotational positions including the open position corresponding to an open detent of the ride plate and the closed position corresponding to a closed detent of the ride plate
- the biased pin includes an outwardly biased spring that biases the biased pin away from a rotational axis of the control
- wherein the ride plate is disposed outside of the control
- a control holder that connects to the control and the housing, wherein the control holder positions the ride plate
- the ride plate is integrally formed with the control holder as a single injection molded piece
- the plate receptacle is defined within the housing and the ride plate is coupled to the plate receptacle of the housing
- the ride plate is made of polyoxymethylene
- the housing is made of polypropylene
- the ride plate includes a plurality of retaining tabs that engage tab recesses of the plate receptacle
- the ride plate is coupled to the housing free of adhesives According to another aspect of the present invention, a vehicle includes a damper for an air register housing. A control is slidably engaged with a ride plate to define a plurality of damper positions. The ride plate is attached to the housing. An outwardly-biased protrusion of the control engages the ride plate. The ride plate is made of a different material than a portion of the housing surrounding the ride plate.

Embodiments of the first aspect of the invention can include any one or a combination of the following features:
- the control is a rotationally-operable control that rotates between open and closed positions
- wherein the ride plate is disposed substantially concentric with the control
- the ride plate defines the plurality of damper positions, the plurality of damper positions including an open position corresponding to an open detent of the ride plate and a closed position corresponding to a closed detent of the ride plate
- the outwardly-biased protrusion selectively and alternatively engages the open and closed detents to define the open and closed positions, respectively
- a low-friction surface is disposed between the open and closed detents
- at least the low-friction surface of the ride plate is made of polyoxymethylene
- the ride plate is disposed within a plate receptacle of the housing that positions the ride plate proximate the damper control
- wherein the ride plate includes a plurality of retaining tabs that engage tab recesses of the plate receptacle According to another aspect of the present invention, a method of forming a vehicle air register includes forming a ride plate that is made of a first material and forming a register housing made of a second material and having a plate receptacle defined therein. The ride plate is disposed within the plate receptacle. A damper and damper control are disposed within the housing. The damper control is slidably engaged with the ride plate to define a plurality of damper positions. The ride plate includes an open detent and a closed detent that selectively define open and closed positions of the damper, respectively. The ride plate includes a low-friction surface that extends between the open and closed detents.

Embodiments of the first aspect of the invention can include any one or a combination of the following features:
- the first material is polyoxymethylene and wherein the ride plate is coupled to the plate receptacle free of adhesives According to another aspect of the present invention, a method of forming a vehicle air register includes forming a control holder that is made of a first material and includes a surface that defines a ride plate, forming a register housing made of a second material and having a control bracket and coupling a damper and damper control to the control holder and the housing. The damper control is slidably engaged with the ride plate to define a plurality of damper positions. The ride plate includes an open detent and a closed detent that selectively define open and closed positions of the damper. The ride plate includes a low-friction surface that extends between the open and closed detents.

Embodiments of the first aspect of the invention can include any one or a combination of the following features:
- the first material is polyoxymethylene and wherein the ride plate is coupled to the plate receptacle free of adhesives These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
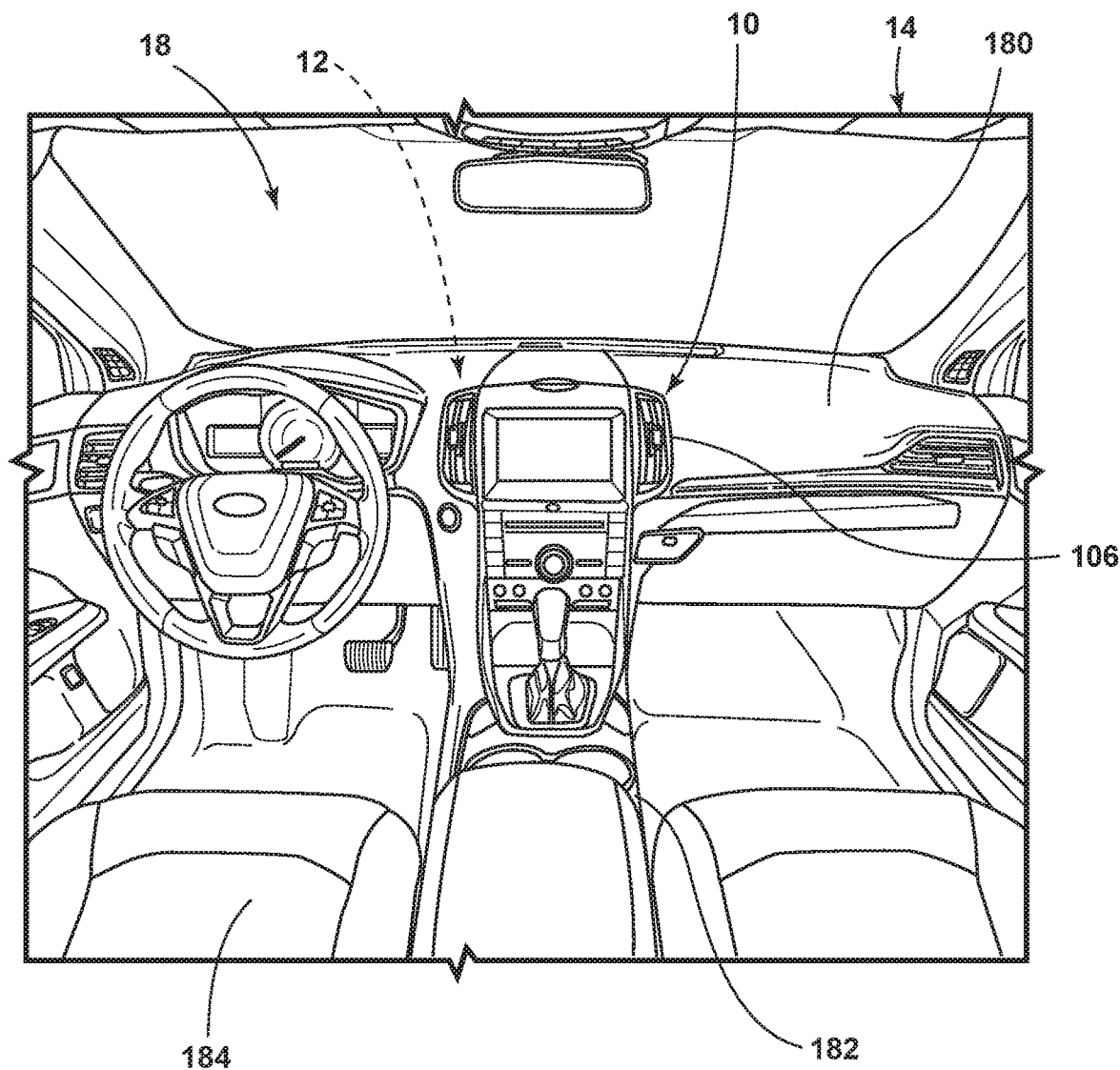
FIG. 1 is a front perspective view of a front dashboard and console incorporating an aspect of the low-friction ride plate within registers of a vehicle HVAC system.
Figure 2:
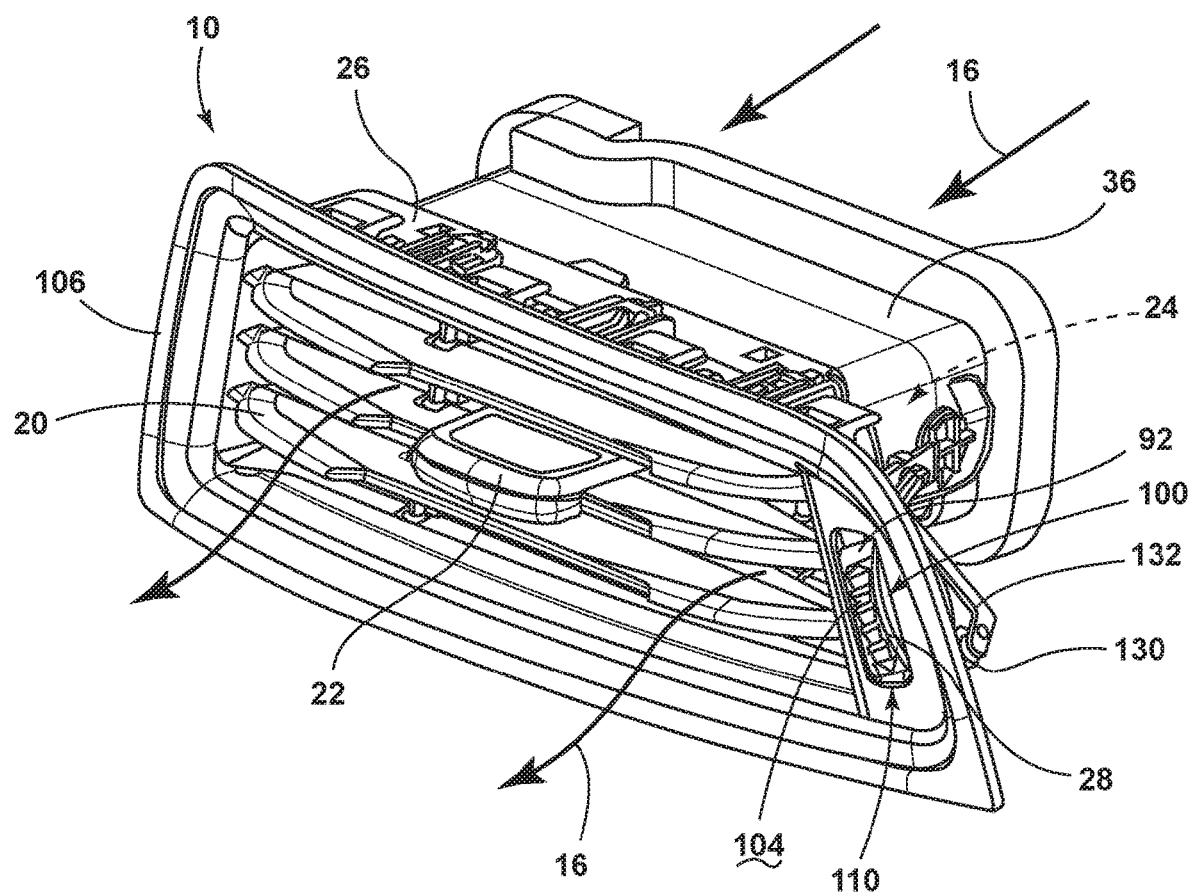
FIG. 2 is a top perspective view of a register for a vehicle HVAC system incorporating an aspect of the low-friction ride plate.
Figure 3:
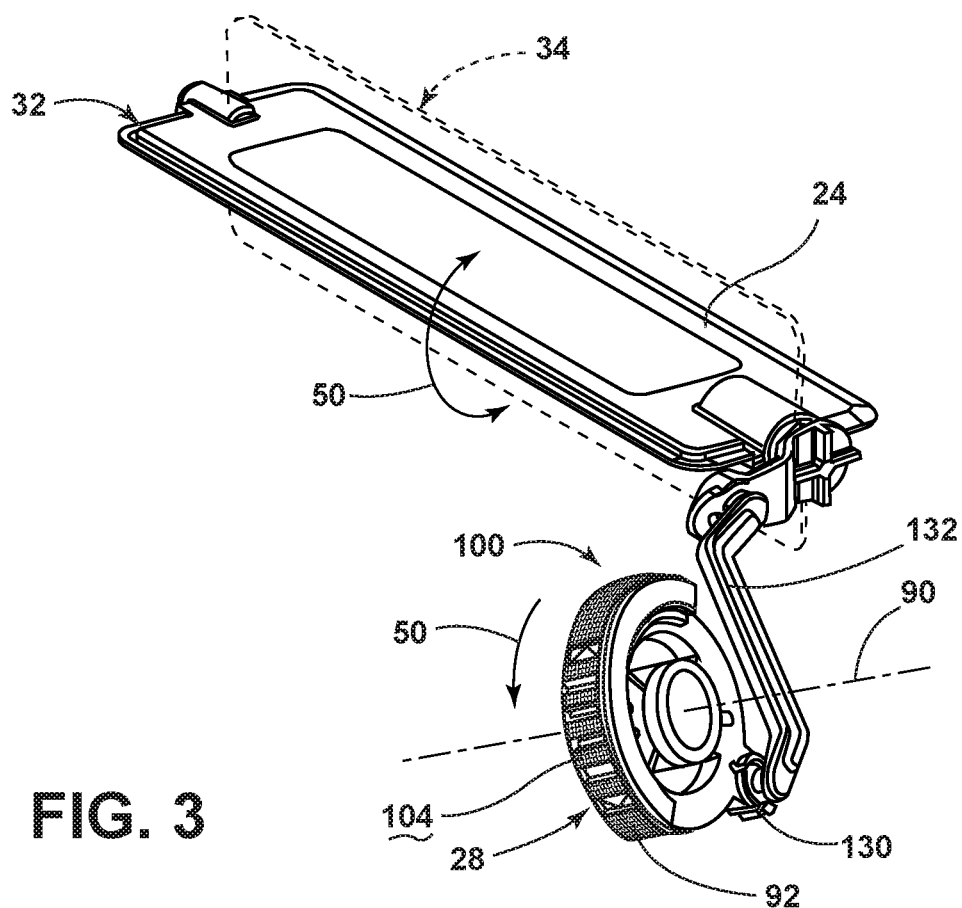
FIG. 3 is a perspective view of the rotationally-operable control and airflow damper of the register of FIG. 2.
Figure 4:
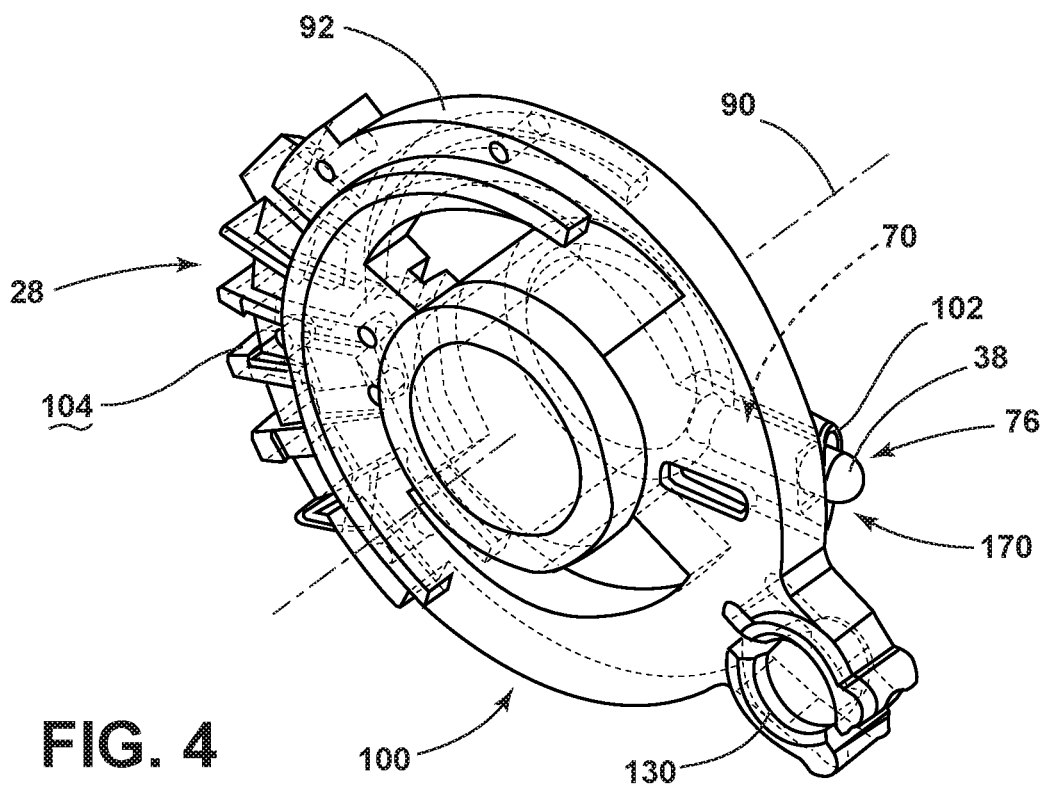
FIG. 4 is a top perspective view of an aspect of a control for an airflow damper that is adapted to engage an aspect of a low-friction ride plate.
Figure 5:
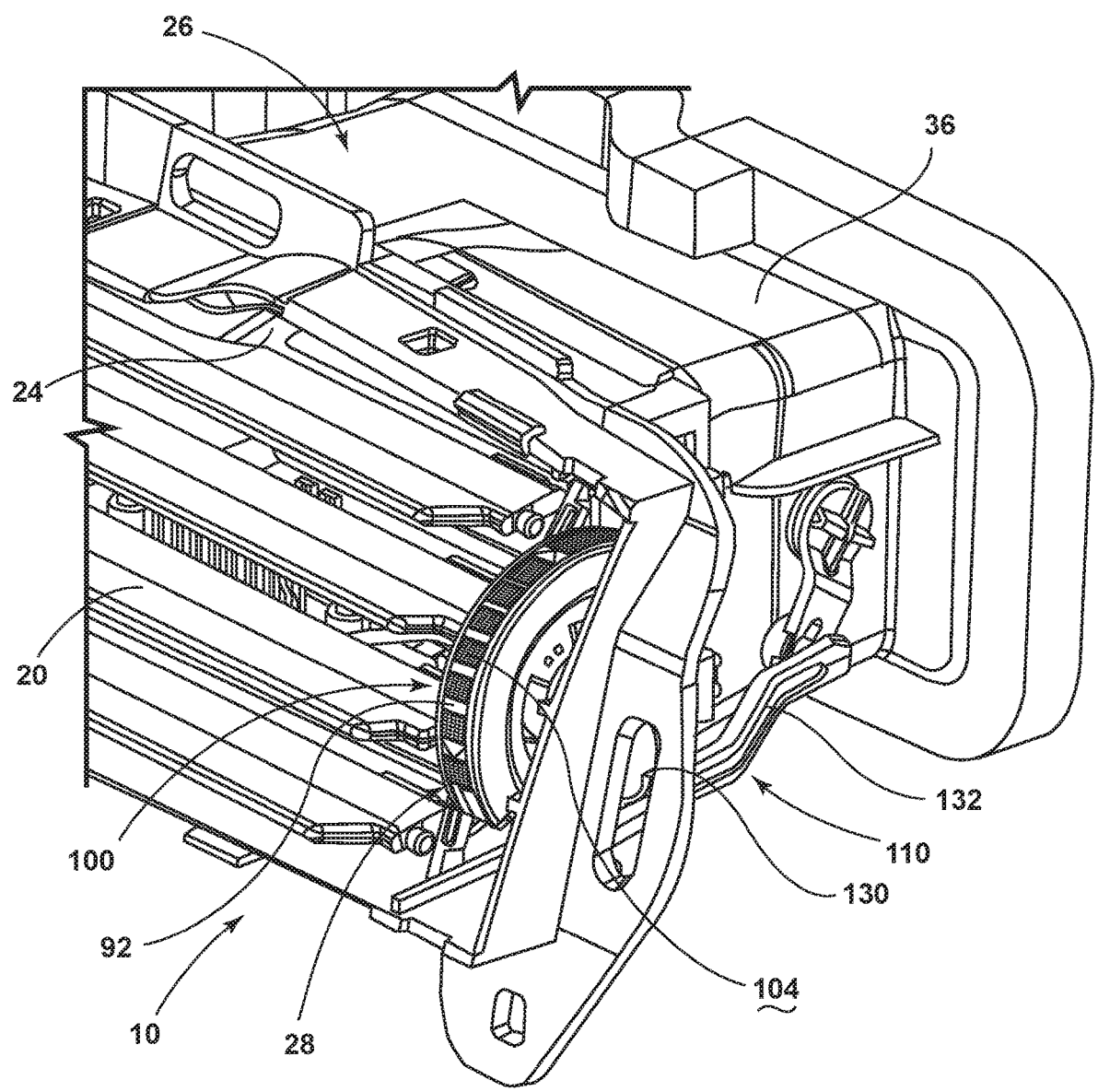
FIG. 5 is a partial top perspective view of an aspect of an air register shown with the outer trim panel removed.
Figure 6:
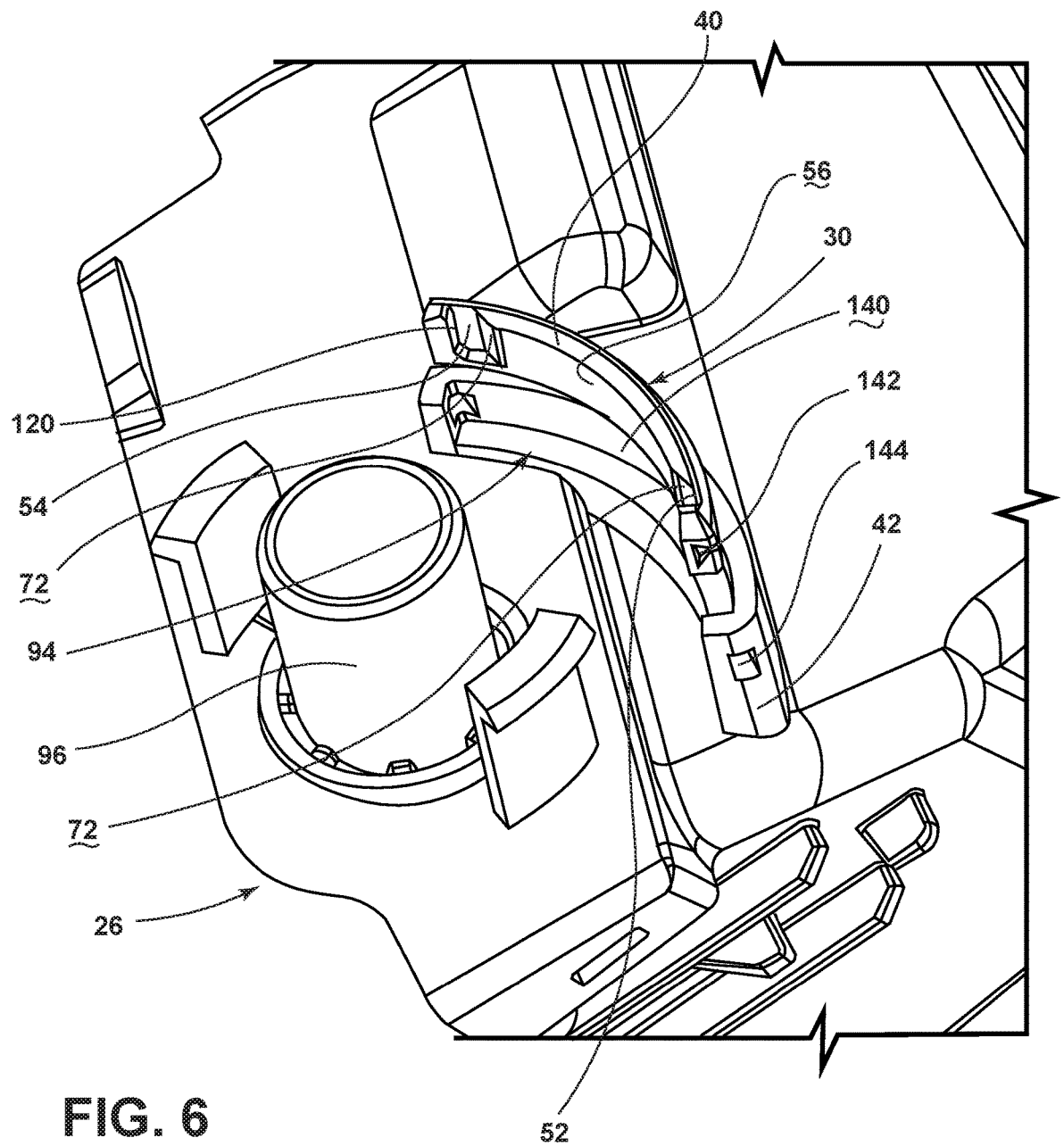
FIG. 6 is a partially exploded perspective view of a plate receptacle incorporated within a register housing for receiving an aspect of the low-friction ride plate.
Figure 7:
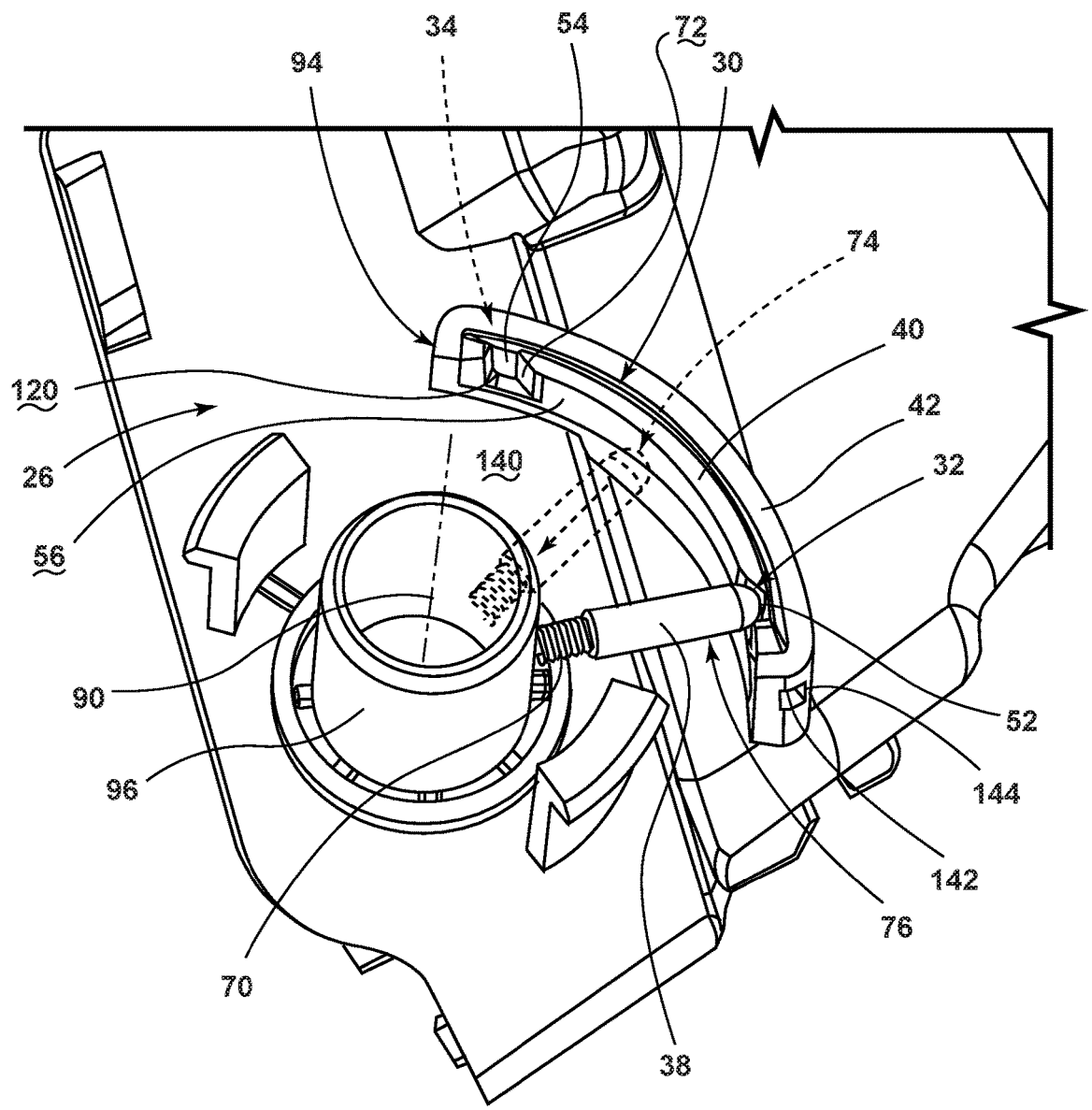
FIG. 7 is a perspective view of the register housing of FIG. 6 showing the low-friction ride plate disposed within the plate receptacle and showing a biased spring engaging a detent of the low-friction ride plate.
Figure 8:
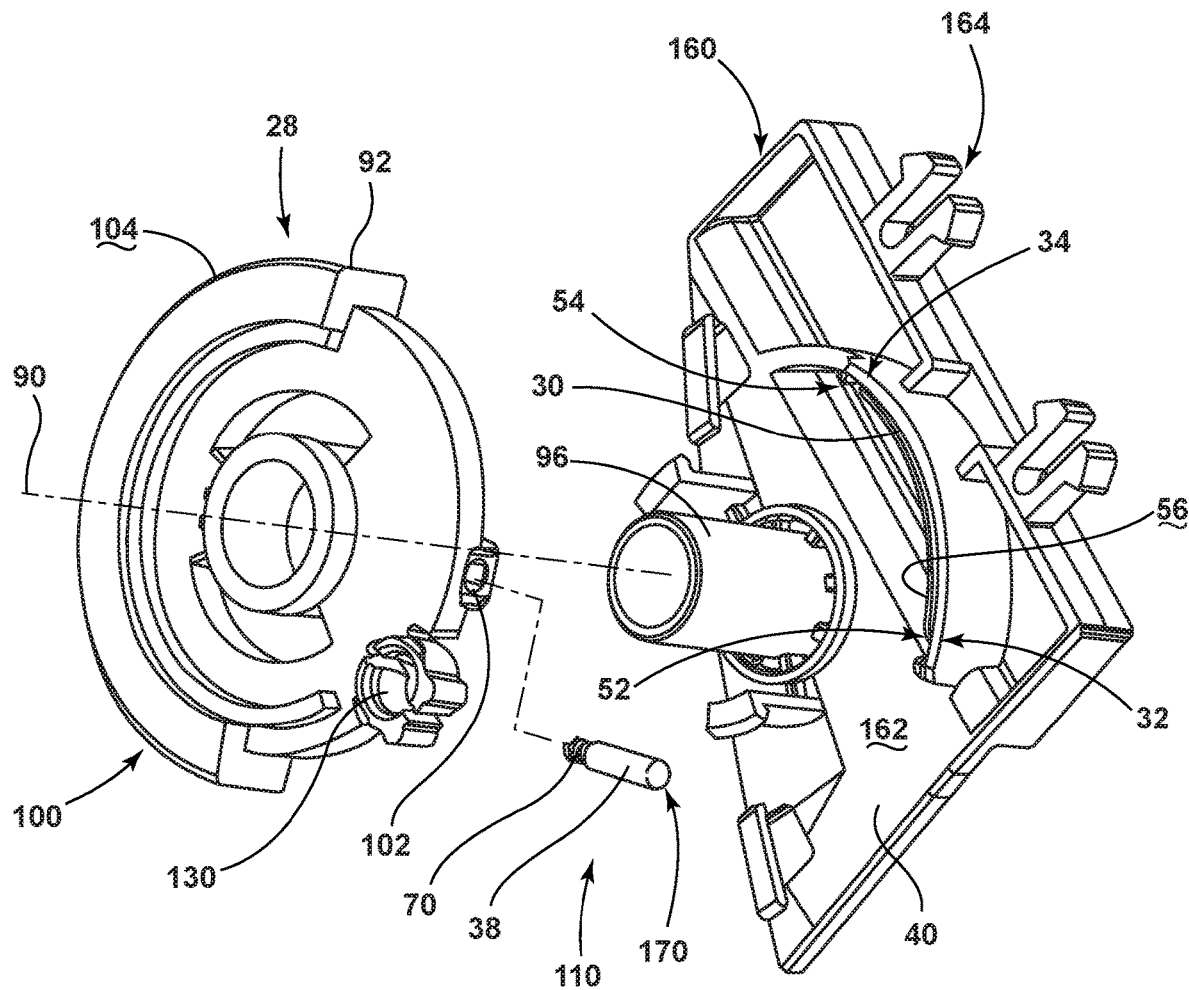
FIG. 8 is a side perspective view of an aspect of the air register showing the low-friction ride plate incorporated within a control holder, and shown with the rotationally-operable control separated from the control holder.
Figure 9:
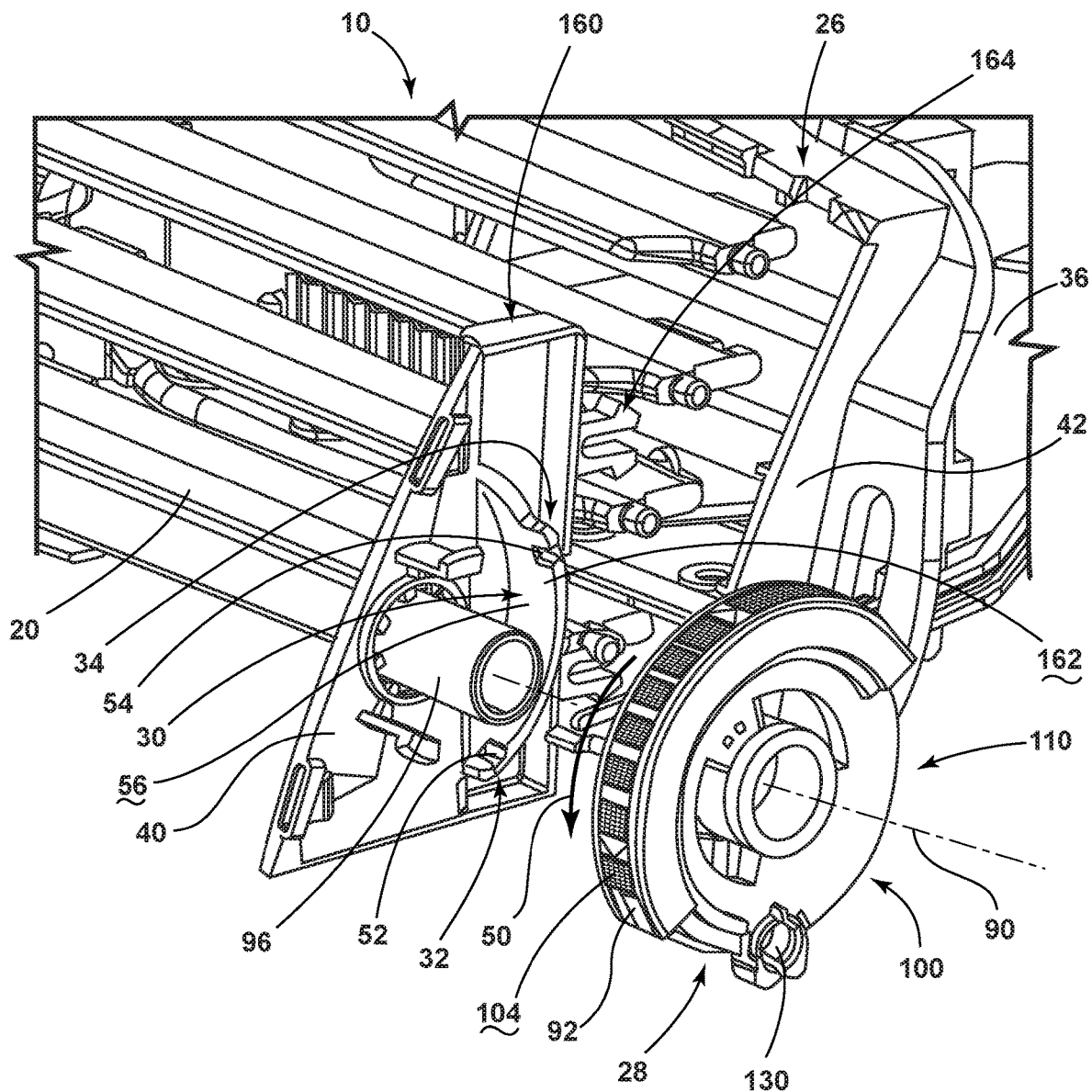
FIG. 9 is a partially exploded perspective view of an air register incorporating the control holder of FIG. 8.
Figure 10:
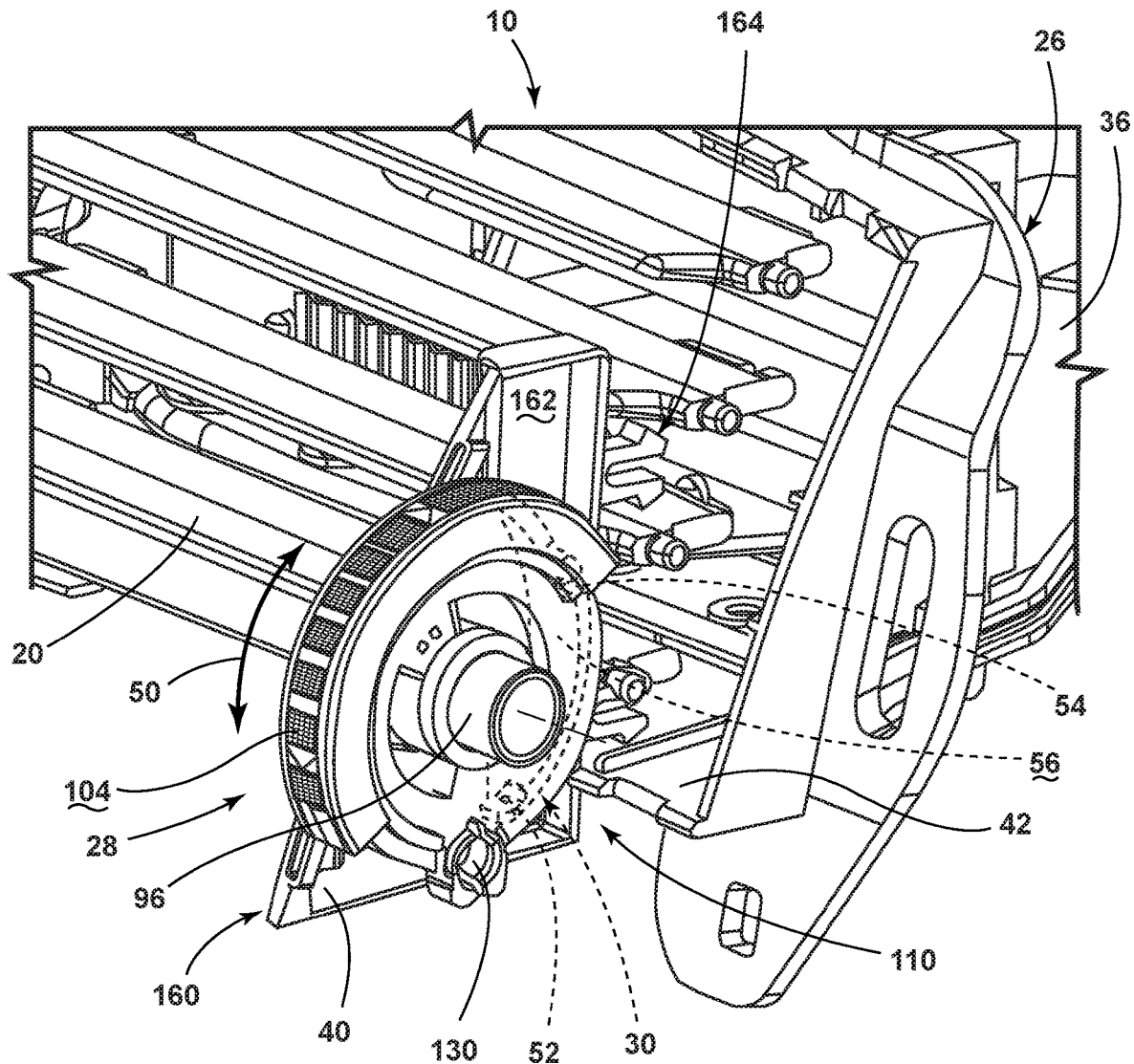
FIG. 10 is a partially exploded perspective view of the air register of FIG. 9 showing the control coupled with the control holder.
Figure 11:
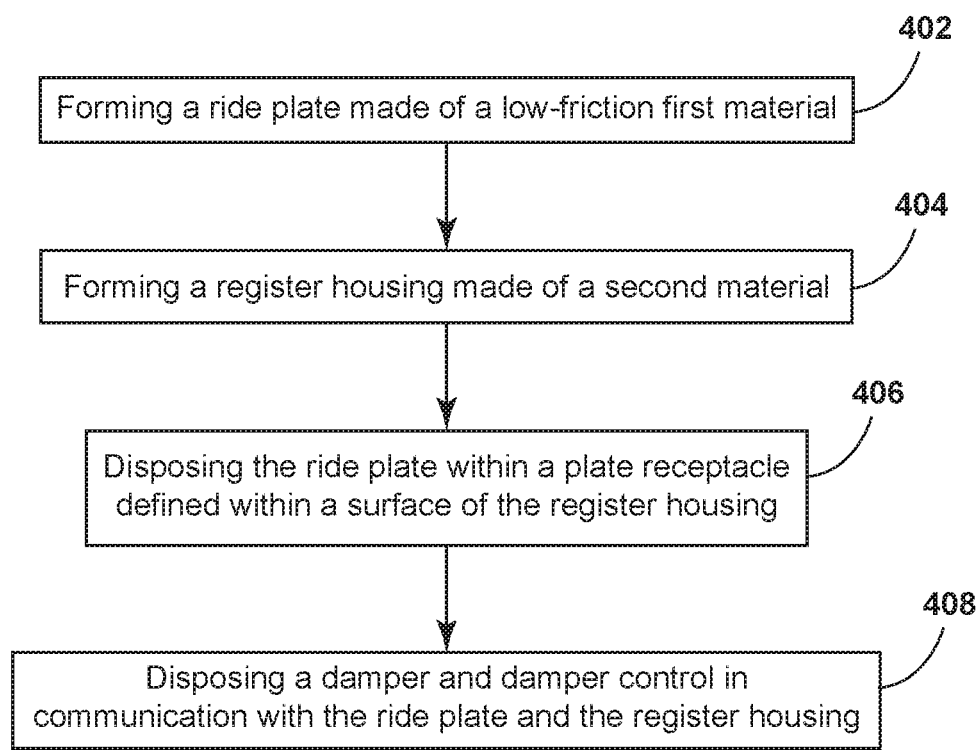
FIG. 11 is a linear flow diagram illustrating a method of forming a vehicle register using a low-friction ride plate.
Figure 12:
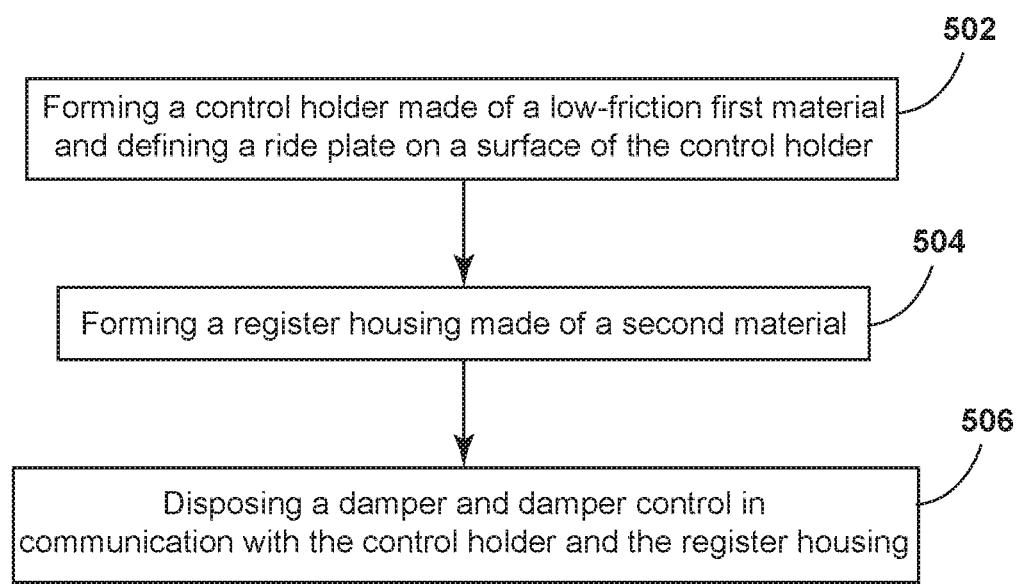
FIG. 12 is a linear flow diagram illustrating a method of forming a vehicle register using a control holder that incorporates a low-friction ride plate.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-7, reference numeral 10 generally refers to an air register for an HVAC system 12 of a vehicle 14 that is used to deliver air 16 into the passenger cabin 18. The air register 10 provides conditioned air 16 for heating and cooling various portions of the passenger cabin 18 during use. The air register 10 typically includes a plurality of vanes 20 and a vane control 22 for positioning the vanes 20. The positioning of the vanes 20 serves to direct the flow of conditioned air 16 in a desired direction. According to various aspects of the device, the air register 10 for the vehicle 14 can include an airflow damper 24 that is disposed within a register housing 26. A rotationally-operable control 28 is coupled to the airflow damper 24 and also the register housing 26. A low-friction ride plate 30 is disposed within the register housing 26. The low-friction ride plate 30 slidably receives the rotationally-operable control 28 to define open and closed positions 32, 34 of the control 28 and the airflow damper 24. The open and closed positions 32, 34 of the airflow damper 24 serve to alternatively unblock and block, respectively, an air conduit 36 of the register housing 26 for controlling the flow of conditioned air 16 through the air register 10. The rotationally-operable control 28 includes a biased pin 38 that engages the low-friction ride plate 30. It is contemplated that the low-friction ride plate 30 is made of a first material 40 that is different than a second material 42 of which the register housing 26 is made. This first material 40 of the low-friction ride plate 30 is typically a material that includes low-friction characteristics that allow for easier sliding movement of the biased pin 38 against the ride plate 30 as opposed to portions of the register housing 26.

Referring again to FIGS. 1-7, the low-friction ride plate 30 includes a plurality of rotational positions 50 of the airflow damper 24. As the biased pin 38 slidably engages the low-friction ride plate 30, the plurality of rotational positions 50 of the airflow damper 24 can be defined by one or more detents defined within the low-friction ride plate 30. Accordingly, the plurality of rotational positions 50 can include the open position 32 that corresponds to an open detent 52 of the ride plate 30. The closed position 34 of the airflow damper 24 can correspond to a closed detent 54 of the ride plate 30. In this manner, the open position 32 of the damper 24 can correspond to the biased pin 38 engaging the open detent 52 such that the biased pin 38 is at least partially retained within the open detent 52. Similarly, the closed position 34 of the damper 24 can correspond to the biased pin 38 engaging the closed detent 54 of the ride plate 30. A low-friction surface 56 of the ride plate 30 is disposed between the open and closed detents 52, 54. Accordingly, as the biased pin 38 is slidably operated between the open and closed detents 52, 54, the low-friction surface 56 of the ride plate 30 allows for smooth and easy slidable engagement of the biased pin 38 within and between the open and closed detents 52, 54.

Referring again to FIGS. 4-7, when the biased pin 38 enters one of the open and closed detents 52, 54, a biasing mechanism 70 selectively and alternatively biases the biased pin 38 into one of the open and closed detents 52, 54. Each of the open and closed detents 52, 54 can include an angled biasing surface 72 that cooperates with the biasing mechanism 70 of the biased pin 38. In this manner, the angled biasing surface 72 operates the biased pin 38 toward a retracted position 74 as the control 28 is moved away from one of the open and/or closed detents 52, 54. The angled biasing surface 72 also allows for smooth operation of the biased pin 38 toward an extended position 76 as the biased pin 38 enters the open or closed detents 52, 54. Additionally, when the control 28 is moved out of the open and closed position 32, 34, the angled biasing surface 72 opposes the biasing mechanism 70 and assists in biasing the biased pin 38 toward the retracted position 74. When the biased pin 38 reaches the angled biasing surface 72 toward one of the open and closed positions 32, 34, the angled biasing surface 72 in conjunction with the biasing mechanism 70 of the biased pin 38 urges the biased pin 38 and also the control 28 into one of the open and closed detents 52, 54 corresponding to the open and closed positions 32, 34 of the airflow damper 24. This engagement of the biased pin 38 with the angled biasing surface 72 and also the open and closed detents 52, 54 further provides tactile feedback, and in some instances auditory feedback, as the biased pin 38 is urged into the open and closed detents 52, 54 of the low-friction ride plate 30.

Referring again to FIGS. 2-7, the biased pin 38 of the control 28 typically includes a biasing mechanism 70 in the form of an outwardly biased spring that biases the biased pin 38 away from a rotational axis 90 of the control 28. In such an embodiment, the low-friction ride plate 30 is disposed outside of the control 28. In various embodiments, the biased pin 38 can be biased in an inward direction by the biasing mechanism 70 and toward the rotational axis 90 of the control 28. In such an embodiment, the ride plate 30 may be positioned within the outer perimeter 92 of the control 28. It is further contemplated that in such an embodiment, a plate receptacle 94 that receives and retains the ride plate 30 can be formed proximate a portion of a spindle 96 of the register housing 26. Typically, the spindle 96 receives the rotationally-operable control 28 and defines the rotational axis 90 of the control 28.

Referring again to FIGS. 2-7, the control 28 typically includes a disc-shaped member 100 where a pin recess 102 is defined within the outer perimeter 92 of the control 28 for receiving a biased pin 38 and also the biasing mechanism 70 that urges the biased pin 38 toward an extended position 76. The control 28 includes a tactile surface 104 along a portion of the outer perimeter 92 of the control 28 that allows for a user to easily engage and manipulate the control 28 for operating the damper 24 between the open and closed positions 32, 34. Typically, the tactile surface 104 of the control 28 extends through an outer trim panel 106 of the air register 10. As the user engages the tactile surface 104 and rotates the control 28 about a rotational axis 90, the biased pin 38 engages the low-friction ride plate 30 and slidably operates in a selective and alternative manner, between the open and closed detents 52, 54 and the low-friction surface 56 disposed therebetween. During this operation, the biased pin 38 is manipulated inward and outward from the pin recess 102 to define the extended position 76 when engaging the open and closed detents 52, 54 and a retracted position 74 when engaging the low-friction surface 56 of the low-friction ride plate 30. The angled biasing surfaces 72 of the open and closed detents 52, 54 serve to assist in the movement of the biased pin 38 between the extended and retracted positions 76, 74.

According to various aspects of the device, the control 28, and in turn, the low-friction ride plate 30, can define an arcuate control assembly 110 where the control 28 is a rotationally-operable control 28 that rotates about the rotational axis 90 of the spindle 96 between open and closed positions 32, 34. In such an embodiment, the ride plate 30 is disposed substantially concentric around the control 28 and with respect to the rotational axis 90 of the control 28.

In various alternative aspects of the device, the control 28 can be a linearly slidable member that operates linearly along a single longitudinal axis of movement between open and closed positions 32, 34 of the damper 24. In such an embodiment, the low-friction ride plate 30 is adapted to be a substantially similar planar member that receives a biased pin 38 as the control 28 operates along the longitudinal axis.

In each of these arcuate and linear configurations, it is contemplated that the biased pin 38 is in continual engagement or substantially continual engagement with the low-friction ride plate 30. Additionally, the open and closed detents 52, 54 can each include outward retaining surfaces 120 that are oriented substantially perpendicular with the remainder of the ride plate 30. These retaining surfaces 120 serve to prevent outward rotation of the control 28 beyond the open and closed positions 32, 34. In this manner, when the biased pin 38 is within one of the open and closed detents 52, 54, the retaining surface 120 contains the biased pin 38 and prevents movement of the biased pin 38 toward the retracted position 74 in a direction away from the angled biasing surface 72 and the low-friction surface 56. Accordingly, the open and closed detents 52, 54, each having a retaining surface 120, also define the outward limits of movement of the control 28. Accordingly, the control 28 is substantially prevented from operating beyond the open and closed detents 52, 54.

Referring again to FIGS. 2-7, it is contemplated that the control 28 can include a linkage adapter 130 to which a linkage 132 connects and within which the linkage 132 can rotate. The linkage 132 can extend from the control 28 to a portion of the damper 24. In this manner, rotational operation of the control 28 is translated through the linkage 132 and to the damper 24 for translating movements of the control 28 to the damper 24 to define the open and closed positions 32, 34, as well as other various rotational positions 50 therebetween. In various aspects of the device, the low-friction ride plate 30 can include a plurality of detents that correspond to various rotational positions 50 of the damper 24 that define open and closed positions 32, 34 and also define various partially open and partially closed positions of the damper 24 to regulate the volume of air 16 that is transmitted through the register housing 26 and into the passenger cabin 18.

Referring again to FIGS. 5-7, it is contemplated that the ride plate 30 can be disposed within a plate receptacle 94. In such an embodiment, the plate receptacle 94 serves to position the ride plate 30 proximate the biased pin 38 of the control 28. The plate receptacle 94 can be integrally defined by an exterior surface 140 of the register housing 26. It is contemplated that in such an embodiment, the ride plate 30 is coupled to the plate receptacle 94 of the register housing 26. To assist in coupling the ride plate 30 with the plate receptacle 94, the ride plate 30 can include a plurality of retaining tabs 142 that engage tab recesses 144 of the plate receptacle 94. When the retaining tabs 142 are seated within the tab recesses 144 of the plate receptacle 94, the ride plate 30 is substantially retained within the plate receptacle 94. In this manner, it is contemplated that the ride plate 30 can be coupled to the register housing 26 in a manner that is free of adhesives, such that the connection between the ride plate 30 and the plate receptacle 94 is accomplished through mechanical engagement of the retaining tabs 142 and tab recesses 144. It is contemplated that adhesives, fasteners, welding operations, and other connecting methods may be used to attach the ride plate 30 to the plate receptacle 94 for securing the ride plate 30 in relation to the control 28 and the biased pin 38. In various aspects of the device, it is contemplated that additional attachment mechanisms may be used to connect the ride plate 30 to the plate receptacle 94. Such aspects can include the ride plate 30 having various retaining tabs 142 that extend around or through portions of the plate receptacle 94. In such an embodiment, the ride plate 30 can at least partially surround the plate receptacle 94. Additionally, a portion of the retaining tabs 142 may extend through a central portion of the plate receptacle 94.

As exemplified in FIGS. 1-7, it is contemplated that the ride plate 30 can be made of various low-friction materials. These materials can include, but are not limited to, polymers, metals, composite materials, and other similar low-friction materials. An exemplary material is polyoxymethylene. This material has shown substantially low-friction characteristics and is also a substantially robust material that can receive and provide for smooth operation of the biased pin 38 against the ride plate 30 during operation of the control 28 between the open and closed positions 32, 34. Conversely, the housing 26 and other components of the air register 10 are typically made of polypropylene and other similar materials that are robust but have characteristics of higher coefficient of friction. The inclusion of the ride plate 30 made of the low-friction material, which may be of a higher grade and more expensive material, can be used in targeted locations to maximize operation of the control 28 without substantially increasing the overall cost of the air register 10 for the vehicle 14. Additionally, the use of the low-friction material of the low-friction ride plate 30 may serve to extend the life of the component parts that engage the ride plate 30 such as the control 28 and the biased pin 38 that slidably engages the ride plate 30.

According to various aspects of the device, it is contemplated that the ride plate 30 can include multiple material components. By way of example, and not limitation, the low-friction surface 56 and the angled biasing surfaces 72 of the ride plate 30 may be made of a low-friction material. Alternatively, the outer portions of the open and closed detents 52, 54 and the respective retaining surfaces 120 may be made of a more robust polypropylene or similar material that may have a higher coefficient of friction. Accordingly, the portions of the ride plate 30 that slidably engage the biased pin 38 may be made of the low-friction material. It is also contemplated that the entire ride plate 30 may be made of the low-friction material.

Referring now to FIGS. 1-5 and 8-10, the air register 10 can include a control holder 160 that connects to both the control 28 and the register housing 26. It is contemplated that the control holder 160 serves to position the ride plate 30 with respect to the control 28. In such an embodiment, the ride plate 30 can be integrally formed within the control holder 160 as a single injection molded piece. Alternatively, the ride plate 30 can be set within a plate receptacle 94 that is defined within an outer surface 162 of the control holder 160 similar to the configuration of the plate receptacle 94 defined within the exterior surface 140 of the register housing 26 as discussed above. Where a control holder 160 is included, the control holder 160 can include the spindle 96 onto which the control 28 slidably engages. The control 28 mounted on the spindle 96 of the control holder 160 is allowed to rotate about the rotational axis 90 of the control 28. The spindle 96 also positions the biased pin 38 in the proper position so that the biased pin 38 can engage the low-friction ride plate 30 and allow for operation of the control 28 between the open detent 52 and closed detent 54. The control holder 160 can include a fastening mechanism 164 that couples with a portion of the register housing 26, such that attachment of the control holder 160 with the register housing 26 serves to couple the control 28 with respect to the register housing 26 and allow for connection of the linkage 132 with the damper 24.

In various aspects of the device that include the control holder 160, it is contemplated that the entire control holder 160 can be made of the low-friction first material 40 such that the outer surface 162 of the control holder 160 can define the low-friction ride plate 30. In various aspects of the device, the control holder 160 can be made of a material substantially similar to that of the remainder of the register housing 26, such that the outer surface 162 of the control holder 160 defines the plate receptacle 94. Where the plate receptacle 94 is included, the low-friction ride plate 30 can be made of a low-friction material and be disposed within the plate receptacle 94 of the control holder 160. The control holder 160 can then be coupled with the register housing 26 to position the control 28 with respect to the linkage 132, the damper 24 and the register housing 26 of the air register 10.

Referring again to FIGS. 1-10, it is contemplated that a vehicle 14 incorporating various aspects of an HVAC system 12 can include a damper 24 that is included within a register housing 26 for an airflow damper 24 of the HVAC system 12. A damper control is slidably engaged with a ride plate 30 to define a plurality of damper positions of the damper 24 and the damper control 28. In such an embodiment, it is contemplated that the ride plate 30 can be attached to the register housing 26. As discussed above, the ride plate 30 can be directly attached to the register housing 26 or can be attached to the register housing 26 via a control holder 160. The damper control 28 can include an outwardly-biased protrusion 170 of the control 28 and engages the ride plate 30. As discussed above, the outwardly-biased protrusion 170 can include a biased pin 38 that is biased outwardly and away from a rotational axis 90 of control 28 by a biasing mechanism 70. The outwardly-biased protrusion 170 can also include other biased features that can selectively engage and disengage portions of the ride plate 30. Typically, the biasing mechanism 70 includes a spring that biases the biased pin 38 in an outward direction, such that the biased pin 38 can operate along the ride plate 30 between the extended and retracted positions 76, 74. This movement of the biased pin 38 between the extended and retracted positions 76, 74 assists the control 28 in defining the open and closed positions 32, 34 with respect to the open and closed detents 52, 54 of the ride plate 30. As discussed above, the ride plate 30 is made of a different material than the portion of the register housing 26 surrounding the ride plate 30. Again, the ride plate 30 is typically made of a low-friction material that is different from the material of the register housing 26 surrounding a ride plate 30.

Referring now to FIGS. 1-11, having described various aspects of the device, a method 400 is disclosed for forming an air register 10 for a vehicle 14 that incorporates an aspect of a low-friction ride plate 30. According to the method 400, a ride plate 30 is formed where the ride plate 30 is made of a first material 40 (step 402). As discussed above, the first material 40 is typically a low-friction material such as polyoxymethylene or other similar low-friction material. According to the method 400, a register housing 26 is formed (step 404). The register housing 26 is typically made of a second material 42 and the housing 26 is formed to include a plate receptacle 94 that is defined within a surface of the register housing 26. Once the register housing 26 is formed, the ride plate 30 is disposed within the plate receptacle 94 defined within the register housing 26 (step 406). A damper 24 and damper control can then be disposed within the housing 26 (step 408). The damper 24 and damper control are placed in communication with the ride plate 30 and the register housing 26 such that operation of the damper control engages the ride plate 30 and moves the damper 24 between the open and closed positions 32, 34. As discussed above, the ride plate 30 includes an open detent 52 and a closed detent 54 to selectively define open and closed positions 32, 34, respectively, of the damper 24. It is contemplated that the ride plate 30 can include a low-friction surface 56 that extends at least between the open and closed detents 52, 54.

Referring now to FIGS. 1-10 and 12, a method 500 is disclosed for forming an air register 10 for a vehicle 14 that incorporates an aspect of a low-friction ride plate 30. According to method 500, a control holder 160 is formed (step 502). The control holder 160 is typically made of a first material 40 and a surface of the control holder 160 can define the ride plate 30. As discussed above, the first material 40 typically includes a low-friction material that can include those materials described herein having low-friction characteristics. A register housing 26 is also formed (step 504). The register housing 26 can be made of a second material 42 such as polypropylene or other similar polymer. It is contemplated that the register housing 26 can define a portion of the fastening mechanism 164 that secures the control holder 160 to the register housing 26. According to the method 500, the damper 24 and damper control 28 can then be coupled to the control holder 160 and the housing 26 via a control bracket or other similar member that makes up the fastening mechanism 164 (step 506). It is contemplated that the damper control 28 is slidably engaged with the ride plate 30 to define the plurality of damper positions that include the open position 32 that corresponds to an open detent 52 of the ride plate 30 and a closed position 34 that corresponds to a closed detent 54 of the ride plate 30.

According to various aspects of the device, it is contemplated that the low-friction ride plate 30 can be incorporated within air registers 10 disposed at any one of various portions of the passenger cabin 18 of the vehicle 14. Such positions can include, but are not limited to, dashboard 180, center console 182, front and rear seating positions 184 of the vehicle 14, positions within side panels of the vehicle 14, positions within the headliner of the vehicle 14, and other positions within the passenger compartment.

According to various aspects of the device, it is contemplated that air registers 10 incorporating the low-friction ride plate 30 can be included within any one of various vehicles 14 that can include, but are not limited to, sedans, SUVs, coupes, cargo vans, mass transit vehicles, mini vans, and other similar vehicles 14.

According to various aspects of the device, the low-friction material can include various materials having low-friction characteristics. Polyoxymethylene is specifically disclosed above. Other similar materials can include, but are not limited to, acetal, polyacetal, polyformaldehyde, various low-friction thermal plastics, and other similar low-friction polymers. The material of the housing 26 can include polypropylene or other similar polymer and can also include various mineral fillers having content within the various polypropylene materials of between approximately 20 percent and approximately 40 percent.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle air register comprising:
   an airflow damper disposed within a register housing;
   a rotationally-operable control coupled to the airflow damper and the register housing;
   a ride plate disposed within the register housing and that slidably receives the control to define open and closed positions of the airflow damper; and
   a control holder that connects to the control and the housing, wherein the control holder positions the ride plate; wherein
      the control includes a biased pin that engages the ride plate;
      the ride plate is made of a different material than the housing; and
      the ride plate is integrally formed with the control holder as a single injection molded piece.

2. The vehicle air register of claim 1, wherein the ride plate is disposed within a plate receptacle that positions the ride plate proximate the control.

3. The vehicle air register of claim 2, wherein the plate receptacle is defined within the housing and the ride plate is coupled to the plate receptacle of the housing.

4. The vehicle air register of claim 2, wherein the ride plate includes a plurality of retaining tabs that engage tab recesses of the plate receptacle.

5. The vehicle air register of claim 4, wherein the ride plate is coupled to the housing free of adhesives.

6. The vehicle air register of claim 1, wherein the ride plate includes a plurality of rotational positions of the airflow damper, the plurality of rotational positions including the open position corresponding to an open detent of the ride plate and the closed position corresponding to a closed detent of the ride plate.

7. The vehicle air register of claim 1, wherein the biased pin includes an outwardly biased spring that biases the biased pin away from a rotational axis of the control, and wherein the ride plate is disposed outside of the control.

8. The vehicle air register of claim 1, wherein the ride plate is made of polyoxymethylene.

9. The vehicle air register of claim 1, wherein the housing is made of polypropylene.

10. A vehicle comprising:
    a damper for an air register housing; and
    a control slidably engaged with a ride plate to define a plurality of damper positions; wherein
       the ride plate is attached to the housing;
       an outwardly-biased protrusion of the control engages the ride plate;
       the ride plate is made of a different material than a portion of the housing surrounding the ride plate;
       the ride plate is disposed within a plate receptacle of the housing that positions the ride plate proximate the control; and
       the ride plate includes a plurality of retaining tabs that engage tab recesses of the plate receptacle.

11. The vehicle of claim 10, wherein the control is a rotationally-operable control that rotates between open and closed positions, and wherein the ride plate is disposed substantially concentric with the control.

12. The vehicle of claim 10, wherein the ride plate defines the plurality of damper positions, the plurality of damper positions including an open position corresponding to an open detent of the ride plate and a closed position corresponding to a closed detent of the ride plate.

13. The vehicle of claim 12, wherein the outwardly-biased protrusion selectively and alternatively engages the open and closed detents to define the open and closed positions, respectively.

14. The vehicle of claim 12, wherein a low-friction surface is disposed between the open and closed detents.

15. The vehicle of claim 14, wherein at least the low-friction surface of the ride plate is made of polyoxymethylene.

16. A method of forming a vehicle air register, the method comprising steps of:
    forming a ride plate that is made of a first material;
    forming a register housing made of a second material and having a plate receptacle defined therein;
    disposing the ride plate within the plate receptacle;
    disposing a damper and damper control within the housing; wherein the damper control is slidably engaged with the ride plate to define a plurality of damper positions;

the ride plate includes an open detent and a closed detent that selectively define open and closed positions of the damper, respectively;

the ride plate includes a low-friction surface that extends between the open and closed detents;

the plate receptacle of the housing positions the ride plate proximate the damper control; and the ride plate includes a plurality of retaining tabs that engage tab recesses of the plate receptacle.

17. The method of claim 16, wherein the first material is polyoxymethylene and wherein the ride plate is coupled to the plate receptacle free of adhesives.

* * * * *